US008162350B1

(12) United States Patent
Parkinson et al.

(10) Patent No.: US 8,162,350 B1
(45) Date of Patent: Apr. 24, 2012

(54) GAS GENERATOR

(75) Inventors: David W. Parkinson, North Ogden, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/900,011

(22) Filed: Oct. 7, 2010

(51) Int. Cl.
B60R 21/26 (2006.01)
(52) U.S. Cl. ........................................ 280/741
(58) Field of Classification Search .......... 280/741, 280/740, 736
See application file for complete search history.

(56) References Cited

U.S. PATENT DOCUMENTS

| | | | |
|---|---|---|---|
| 3,810,655 A * | 5/1974 | Prachar | 280/736 |
| 4,998,751 A | 3/1991 | Paxton et al. | |
| 5,109,772 A | 5/1992 | Cunningham et al. | |
| 5,197,756 A * | 3/1993 | Jarboe et al. | 280/728.1 |
| 5,423,384 A | 6/1995 | Galbraith et al. | |
| 5,449,041 A | 9/1995 | Galbraith | |
| 5,465,795 A | 11/1995 | Galbraith et al. | |
| 5,529,335 A * | 6/1996 | Bohmler | 280/741 |
| 5,542,704 A * | 8/1996 | Hamilton et al. | 280/741 |
| 5,551,724 A * | 9/1996 | Armstrong et al. | 280/737 |
| 5,609,210 A | 3/1997 | Galbraith et al. | |
| 5,613,562 A | 3/1997 | Galbraith et al. | |
| 5,772,243 A | 6/1998 | Green et al. | |
| 5,845,933 A * | 12/1998 | Walker et al. | 280/741 |
| 5,868,424 A * | 2/1999 | Hamilton et al. | 280/741 |
| 5,992,528 A | 11/1999 | Parkinson et al. | |
| 6,039,347 A | 3/2000 | Maynard | |
| 6,164,383 A | 12/2000 | Thomas | |
| 6,170,867 B1 * | 1/2001 | Rink et al. | 280/736 |
| 6,196,583 B1 | 3/2001 | Ruckdeschel et al. | |
| 6,371,213 B1 | 4/2002 | Smith et al. | |
| 6,412,816 B1 * | 7/2002 | Gast et al. | 280/736 |
| 6,513,602 B1 | 2/2003 | Lewis et al. | |
| 6,981,555 B2 | 1/2006 | Smith et al. | |
| 7,059,633 B2 | 6/2006 | Wang et al. | |
| 7,073,820 B2 | 7/2006 | McCormick | |
| 7,185,588 B2 * | 3/2007 | Clark et al. | 102/530 |
| 7,451,829 B2 | 11/2008 | Thompson | |

(Continued)

FOREIGN PATENT DOCUMENTS

DE 196 02 695 A1 7/1997

(Continued)

OTHER PUBLICATIONS

Concurrently filed co-pending Patent Application, Matthew X. Cox et al., titled, "Inflator-Based Fire Suppression,".

(Continued)

*Primary Examiner* — Faye M. Fleming
(74) *Attorney, Agent, or Firm* — Sally J. Brown; Pauley Petersen & Erickson

(57) ABSTRACT

Gas generator devices and related assemblies are provided that include adjacently disposed ignition and gas generant chambers. Within the gas generant chamber, a quantity of gas generant material is contained within one or more containers having a perforated side wall and oppositely disposed first and second end walls. The first end wall is perforated and disposed adjacent the ignition chamber to allow communication of at least a portion of the ignition products therethrough and into contact with gas generant material therein contained to ignite the gas generant material to produce a product gas. The second end wall is perforated to allow gas flow communication of the product gas therethrough for discharge from the gas generator.

20 Claims, 7 Drawing Sheets

U.S. PATENT DOCUMENTS

| | | | |
|---|---|---|---|
| 7,455,119 B2 | 11/2008 | Thompson | |
| 7,540,241 B2 * | 6/2009 | Bierwirth | 102/530 |
| 7,597,153 B2 | 10/2009 | Thompson | |
| 7,600,783 B2 * | 10/2009 | Numoto et al. | 280/741 |
| 7,770,924 B2 * | 8/2010 | Cox et al. | 280/741 |
| 2005/0235863 A1 | 10/2005 | Stevens | |
| 2006/0043716 A1 * | 3/2006 | Quioc et al. | 280/741 |
| 2007/0013179 A1 * | 1/2007 | Numoto et al. | 280/741 |
| 2007/0063494 A1 * | 3/2007 | Saito et al. | 280/736 |
| 2009/0152851 A1 * | 6/2009 | Clark et al. | 280/741 |
| 2010/0013201 A1 * | 1/2010 | Cox et al. | 280/741 |
| 2010/0307775 A1 | 12/2010 | Robbins et al. | |

FOREIGN PATENT DOCUMENTS

| | | |
|---|---|---|
| WO | WO 2008/140441 A1 | 11/2008 |

OTHER PUBLICATIONS

Co-pending U.S. Appl. No. 12/723,275, "Additives for Liquid-Cooled Inflators," filed Mar. 12, 2010.

Co-pending U.S. Appl. No. 12/723,331, "Multi-Stage Inflator," filed Mar. 12, 2010.

http://www.navair.navy.mil/echTrans/index.cfm?map=local.ccms.view.aB&doc=paper.r, "Pyrotechnic Fire Extinguishers," Navair-T2 Technology Transfer, printed May 18, 2009.

Holland, G. et al., "Sustainable Fire Protection for Military Vehicle and Aircraft Applicaitons," Suppression and Detection Research and Applications—A Technical Working Conference, Orlando, Florida, Mar. 11-13, 2008 (12 pages).

* cited by examiner

GAS GENERATOR

BACKGROUND OF THE INVENTION

This invention relates generally to gas generators and, more particularly, to inflator-type gas generators. As described in greater detail below, such gas generators, while having a broad range of possible and desirable uses, may find particular utility in fire suppression applications.

In the past, Halon halocarbons have found extensive application in connection with fire suppression. The term. "Halon halocarbons" generally refers to haloalkanes, or halogenoalkanes, a group of chemical compounds consisting of alkanes with linked halogens and, in particular, to bromine-containing haloalkanes. Halon halocarbons are generally efficient in extinguishing most types of fires, desirably are electrically non-conductive, tend to dissipate rapidly without residue formation and to be relatively safe for limited human exposure. In the past, Halon halocarbons, such as the halocarbon Halon 1301 (bromotrifluoromethane, $CBrF_3$), have found utility as fire suppressants in or for areas or buildings typically not well suited for application of water sprinkler systems, areas such as data and computer centers, museums, libraries, surgical suites and other locations where application of water-based suppressants can result in irreparable damage to electronics, vital archival collections or the like.

Halon halocarbons, however, have been found to have a detrimental impact on the environment due to an ozone deleting aspect with respect to the atmosphere. Consequently, there is a need for effective alternatives to Halon halocarbons for fire suppression and similar applications.

SUMMARY OF THE INVENTION

There are provided improved gas generator devices and associated or corresponding assemblies.

A more specific objective of the invention is to overcome one or more of the problems described above.

In a first aspect, there is provided a gas generator that includes a housing having oppositely disposed first and second ends. Adjacent the first end, the housing at least in part defines a first chamber containing a quantity of ignition material. Adjacent the second end, the housing at least in part defines a second chamber containing a quantity of gas generant material. The gas generator also includes an initiator operatively associated with the first chamber and in reaction initiating communication with at least a portion of the quantity of ignition material. The initiator, upon actuation, serves to initiate reaction of at least a portion of the quantity of ignition material to form ignition products. In the gas generator, the second chamber includes at least one container wherein at least a portion of the quantity of gas generant material is contained. The container has a perforated side wall and oppositely disposed first and second end walls, with the first end wall perforated and disposed adjacent the first chamber to allow communication of at least a portion of the ignition products therethrough and into contact with gas generant material therein contained to ignite the gas generant material to produce a product gas. The second end wall is perforated to allow gas flow communication of the product gas therethrough for discharge from the gas generator.

In another aspect, there is provided a gas generator assembly. The gas generator assembly includes an enclosed housing having an elongated length and oppositely disposed first and second ends. Adjacent the first end, the housing at least in part defines a first chamber containing a quantity of ignition material tablets. Adjacent the second end, the housing at least in part defines an elongated second chamber containing a quantity of gas generant material. The assembly further includes an initiator operatively associated with the first chamber and in reaction initiating communication with at least a portion of the quantity of ignition material tablets. The initiator, upon actuation, serves to initiate reaction of at least a portion of the quantity of ignition material tablets to form ignition products. The second chamber at least in part contains at least first and second gas generant containers. The first and the second gas generant containers each include a perforated cylindrical tube having oppositely disposed first and second end walls with a plurality of gas generant material wafers disposed therebetween. The first end walls each include a first perforated retainer disk secured to the first end of the respective perforated cylindrical tube and disposed adjacent the first chamber to allow communication of at least a portion of the ignition products therethrough and into contact with gas generant material therein contained to ignite the gas generant material to produce a product gas. The second end walls each include a second perforated retainer disk secured to the second end of the respective perforated cylindrical tube perforated to allow gas flow communication of the product gas therethrough for discharge from the gas generator. The gas generator assembly additionally includes a tube first end retainer plate disposed between the first chamber and the first end walls of the first and second gas generant containers. The gas generator also includes a tube second end retainer plate disposed adjacent the second end walls of the first and second gas generant containers opposite the plurality of gas generant material wafers.

Other objects and advantages will be apparent to those skilled in the art from the following detailed description taken in conjunction with the appended claims and drawings.

DESCRIPTION OF PREFERRED EMBODIMENTS

Improved gas generator devices and associated or corresponding assemblies have been developed and are herein described. While certain aspects of the development are described below making specific reference to gas generators particularly suited for use in fire suppression applications, the broader practice and use of the invention is not necessarily limited to fire suppression applications as various of the described features can be applied to gas generators used in other applications including, for example, inflatable vehicular occupant safety restraint systems.

It is noted that a subject gas generator device constructed for a fire suppression application is typically significantly larger than gas generators constructed for application in standard passenger vehicular supplemental restraint system applications. For such larger gas generator constructions, the forces associated and involved with operations such as the handling, manufacture, transportation and implementation are correspondingly also commonly significantly larger. As described in greater detail below, a generator device in accordance with certain preferred embodiments advantageously includes various features such as can desirably serve to protect contained gas generant material from the impact of forces such as may otherwise cause movement and deterioration of the gas generant material or its forms.

Figure 1:
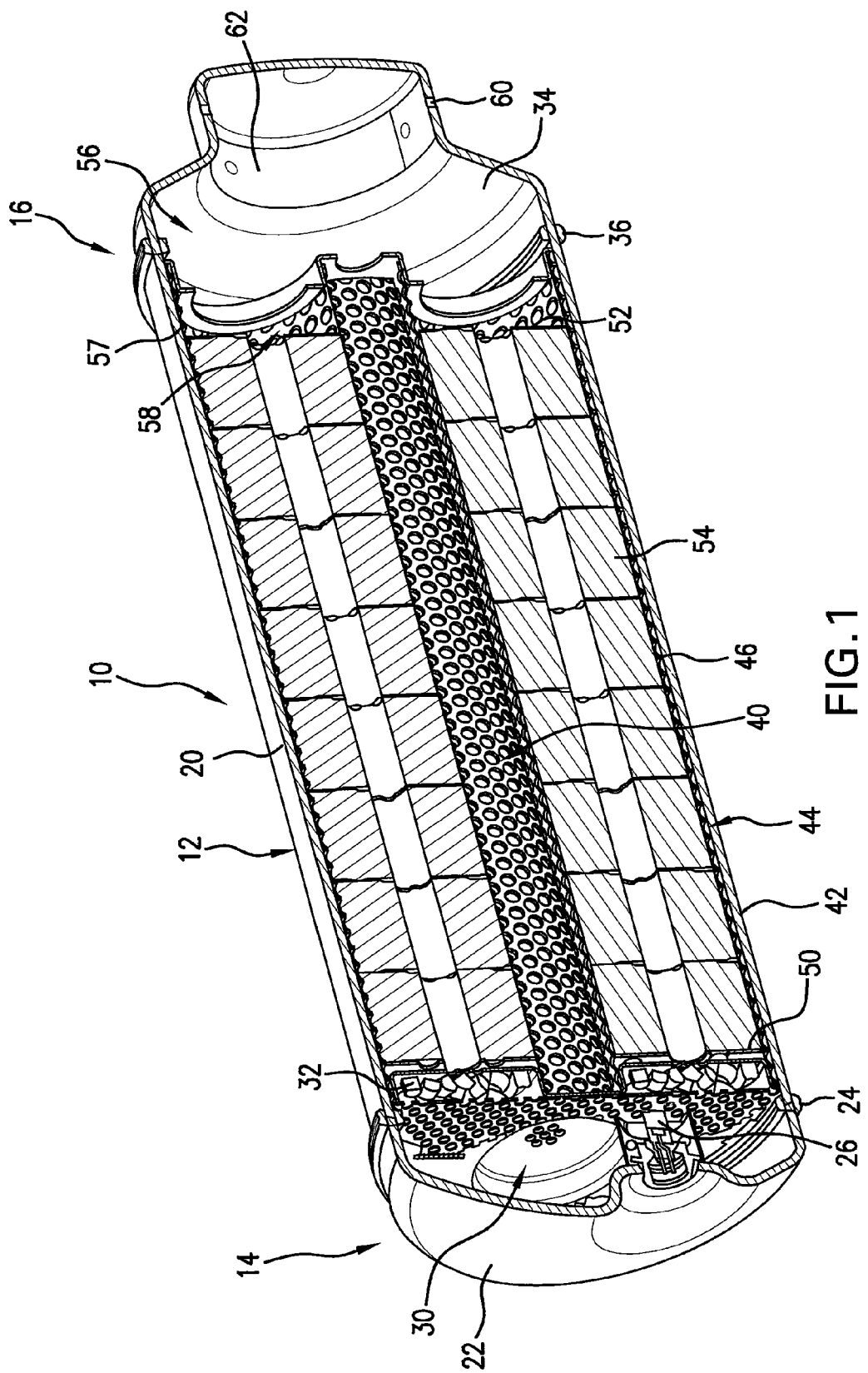
FIG. 1 is a sectional view of a gas generator in accordance with one aspect of the invention.

In FIG. 1, there is illustrated a gas generator device, in accordance with one aspect of the invention. The gas generator device is generally designated with the reference numeral 10.

The gas generator 10 has a generally cylindrical external outline and includes a generally cylindrical housing 12, such as having a tubular elongated form, and having opposed first and second ends, 14 and 16, respectively. The housing 12 may desirably be formed or made of metal or steel or other materials as may be desired for particular applications. The housing can be of a one-piece or multi-piece construction, as may be desired.

In the illustrated embodiment, the housing 12 is in part composed of a cylindrical wall 20 and the housing first end 14 is closed by a base end wall 22. In accordance with one preferred aspect of the invention, the base end wall 22 can be connected or joined to the cylindrical wall 20 via an inertia weld 24.

An initiator 26 is fixed to and extends from the base end wall 22 at the housing first end 14. Thus, the first end 14 is sometimes referred to as the "initiator end" or "igniter end" of the gas generator device 10. Adjacent to the initiator end 14, the housing 12 at least in part defines a first chamber 30 containing a quantity of ignition material 32 such as known in the art and such as is reactable to form ignition products. Thus, the first chamber 30 is sometimes referred to as an "ignition chamber."

Common initiator devices employed in or with gas generator devices are electronically activated. As will be appreciated by those skilled in the art and guided by the teachings herein provided, placement or positioning of electrical connections such as may be required with or by such an initiator at or on a single end of the gas generator device can desirably facilitate or simplify the incorporation of such a gas generator device in various locations and structures.

The housing second end 16 is closed by a diffuser end cap 34. Thus, the second end 16 is sometimes referred to as the "diffuser end" of the gas generator device. In accordance with one preferred aspect of the invention, the diffuser end cap 34 can be connected or joined to the cylindrical wall 20 via an inertia weld 36.

A second chamber 40 is interposed between the ignition chamber 30 and the diffuser end 16. The second chamber 40 contains a quantity of gas generant material, generally designated by the reference numeral 42, such as known in the art and such as is reactable such as by combustion to form product gas. Thus, the second chamber 40 is sometimes referred to as a "gas generant chamber" or a "combustion chamber."

The gas generant material 42 is shown as contained or housed within gas generant containers, generally designated by the reference numeral 44 disposed within the gas generant chamber 40. The gas generant containers 44 each generally include an elongated cylindrical tube 46 and oppositely disposed first and second end walls, 50 and 52, respectively, with a quantity of gas generant material, such as in the form of a plurality of gas generant material wafers 54, disposed therebetween. The gas generant material wafers 54 may, if desired and as shown, include a central opening 55, described in greater detail below.

The cylindrical tubes 46 and the first and second end walls 50 and 52 can desirably each be perforated or otherwise formed or shaped to permit gas flow communication therethrough. Those skilled in the art and guided by the teachings herein provided will understand and appreciate that such tubes and end walls can be fabricated of various materials of constructions such as known in the art. For example, either or both such tubes and end walls can be fabricated of materials such as aluminum, steel, etc., with steel being a presently preferred material of constructions. The first end walls 50 are disposed adjacent the ignition chamber 30 to allow communication of at least a portion of the ignition products therethrough and into contact with the gas generant material 42 contained within the respective gas generant container 44 to ignite the gas generant material 42 to produce a product gas.

The second end walls 52 are disposed to allow gas flow communication of the product gas therethrough for passage from the gas generant chamber 40 into a diffuser chamber or section 56 such as at least in part formed or defined by, at or adjacent the housing second end 16 and/or the diffuser end cap 34. If desired, and as shown, an end portion 57 of the cylindrical tube 46 may extend beyond the second end wall 52 such as to form an end tube volume 58 such as to facilitate product gas flow from the combustion chamber 40 to the diffuser chamber 56. (See also, FIG. 8.) The product gas can then exit the gas generator device 10 via openings 60 such as formed in the diffuser end cap 34.

As will be appreciated by those skilled in the art and guided by the teachings herein provided, the openings 60 can normally (e.g., when the apparatus is in a static or prior to actuation state) desirably be sealed or covered such as by means of a pressure sensitive covering or barrier 62 such as to prevent undesired passage of materials through the openings 60. Such covering may, for example, take the form of an adhesive-backed foil band or the like. As is known, such covering can be selected to open or rupture upon the application of a predetermined pressure against the covering from the interior of the gas generator 10.

Figure 2:
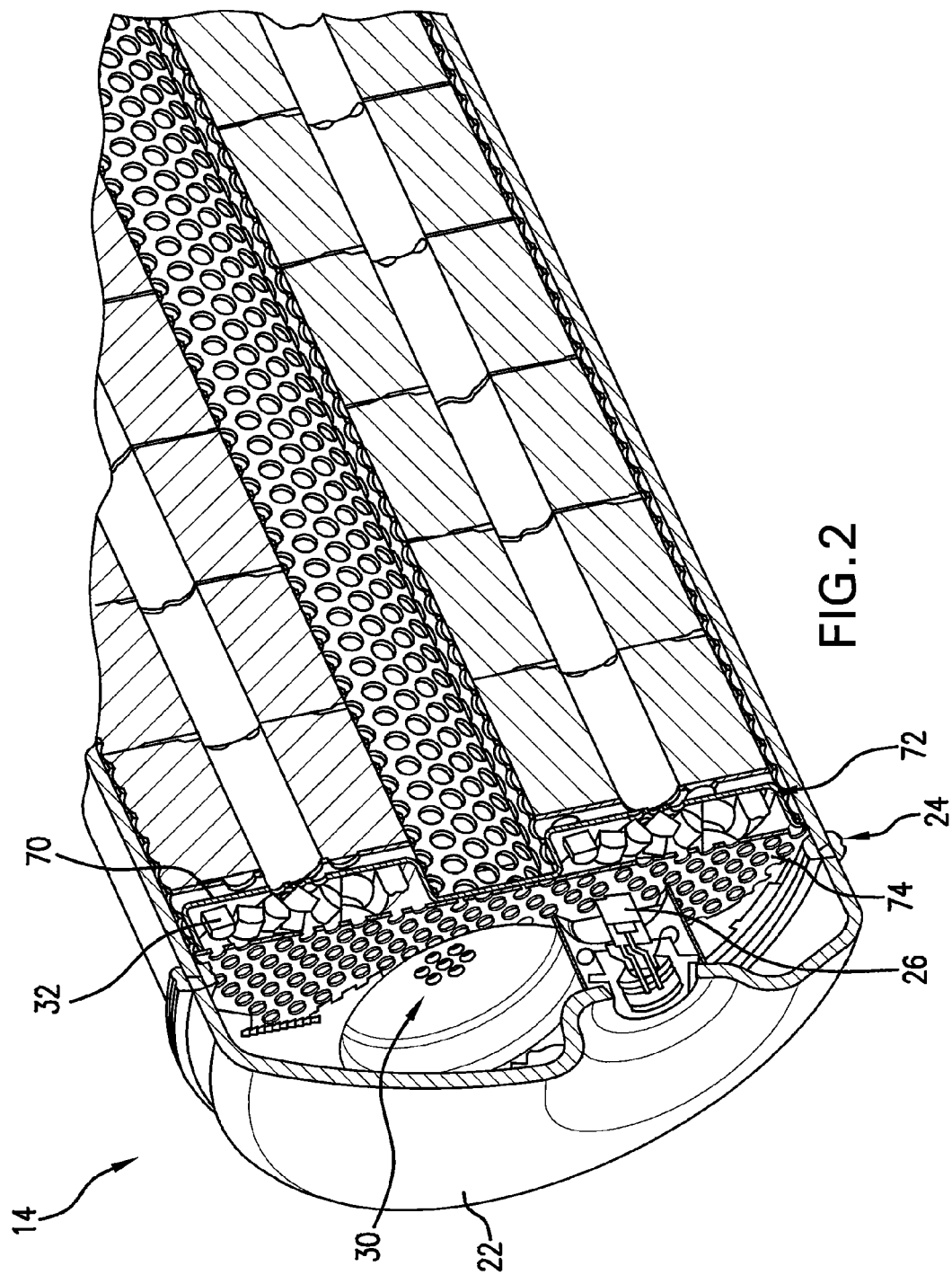
FIG. 2 is an enlarged fragmentary sectional view of the gas generator shown in FIG. 1.

Turning now to FIG. 2, the initiator end 14 and, more particularly, the ignition chamber 30 of the gas generator device 10 is shown in greater detail.

The ignition material 32 is shown as disposed in one or more perforated cups 70 in an igniter end retainer plate 72. While the ignition material 32 is shown as being the form of tablets, those skilled in the art and guided by the teachings herein provided will appreciate that various forms of ignition material, such as known in the art, for example, can be used and thus the broader practice of the invention is not necessarily limited by or to the incorporation and/or the use of specific or particular forms of ignition material.

The ignition material tablets 32 are shown as retained within the respective igniter end retainer plate perforated cups 70 with the aid of a screen mesh 74 disposed adjacent to the igniter end retainer plate 72. As shown, the initiator 26 can desirably be fixed to and extend from the base end wall 22 at the housing first end 14 adjacent to an ignition material-containing perforated cup so to better ensure ignition of the ignition material upon proper actuation of the gas generator device 10.

As will be discussed in greater detail below, the construction of the gas generator device 10 provides or results in a relative small ignition chamber 30, particularly in view of the gas generant load contained in the device.

Figure 3:
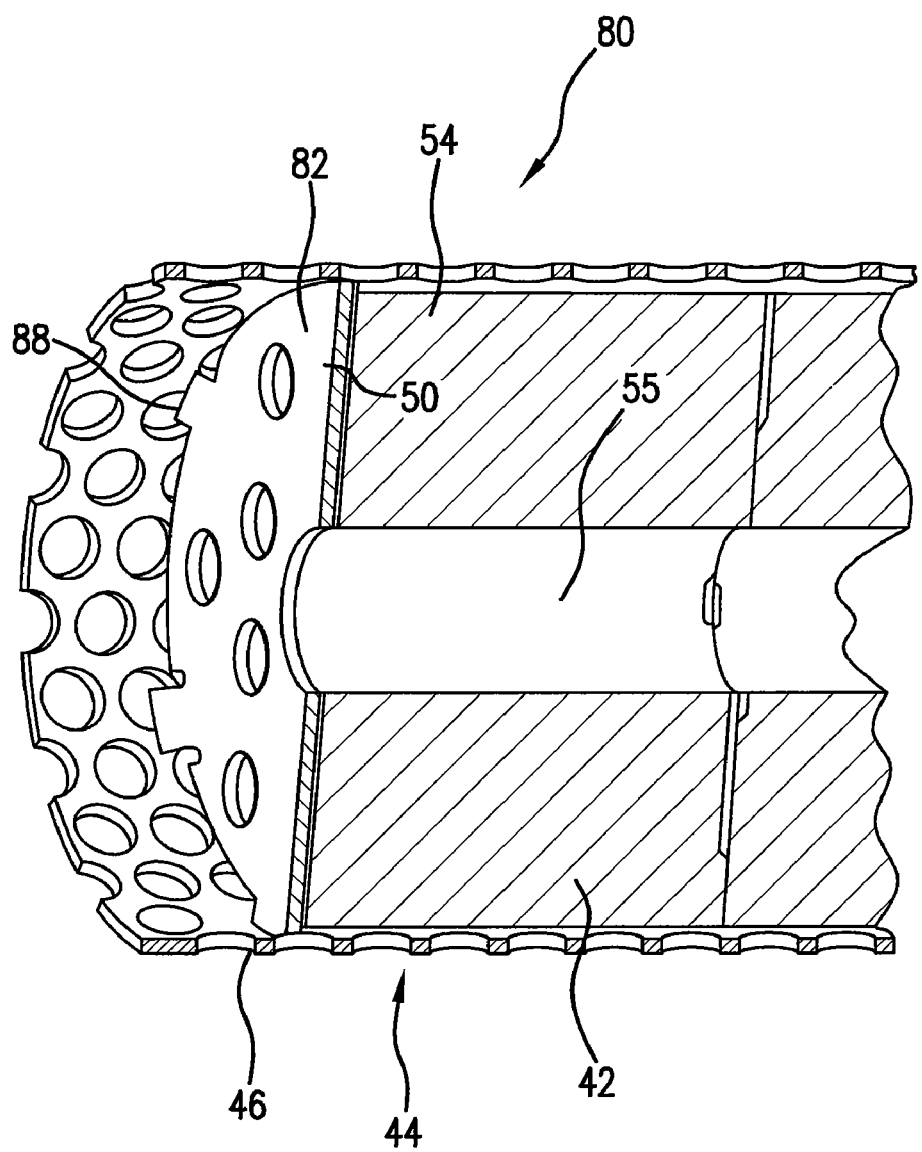
FIG. 3 is an enlarged fragmentary sectional view highlighting an igniter end of a gas generant container construction in accordance with one embodiment

Turning now to FIG. 3, an igniter end section portion, generally designated by the reference numeral 80, highlighting the gas generant container construction 44, is shown.

The igniter end section portion 80 shows the elongated cylindrical tube 46 such as containing or housing the gas generant material 42 therein, and the end wall 50 composed of a generally planar retainer disk 82. As the retainer disk 82 is disposed generally adjacent the ignition chamber, the retainer disk 82 is sometimes referred to as an igniter end wall.

While the gas generant material 42 is shown as being the form of wafers, those skilled in the art and guided by the teachings herein provided will appreciate that various forms of gas generant material, such as known in the art, for example, can be used and thus the broader practice of the invention is not necessarily limited by or to the incorporation and/or the use of specific or particular forms of gas generant material.

The gas generant wafers 54, each include a central opening 55.

Figure 4:
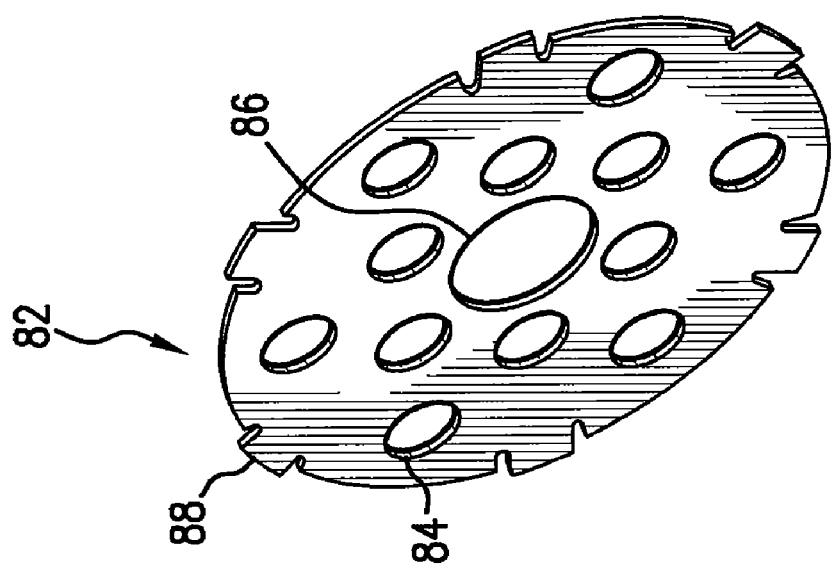
FIG. 4 is an enlarged perspective view of an igniter end retainer disk in isolation and in accordance with one embodiment.

The igniter end retainer disk 82, is shown in isolation in FIG. 4. The retainer disk 82 is generally circular in cross section and is perforated or otherwise formed or shaped to allow communication of at least a portion of the ignition products therethrough and into contact with the gas generant material contained within the respective gas generant container to ignite the gas generant material to produce a product gas. The retainer disk 82 includes perforations or holes generally designated by the reference numeral 84 and including a central opening 86 axially aligned with the central opening 55 of the gas generant material wafers 54. The perforations or holes 84 allow and facilitate contact of the ignition products with the gas generant wafers. The disk central opening 86 in particular desirably can serve to distribute ignition products to the entire length of the gas generant wafer stack contained in the gas generant container tube. Thus better ensuring the desired rapid ignition of the gas generant wafers.

The retainer disk 82 also includes a plurality of deformable joinder tabs 88. The joinder tabs 88 may, for example, structurally deform upon insertion into the container tube 46 at or near the respective end thereof, such as shown in FIG. 3, and thereby positively retain the gas generant wafers 54 in the gas generant container tube 44.

Figure 5:
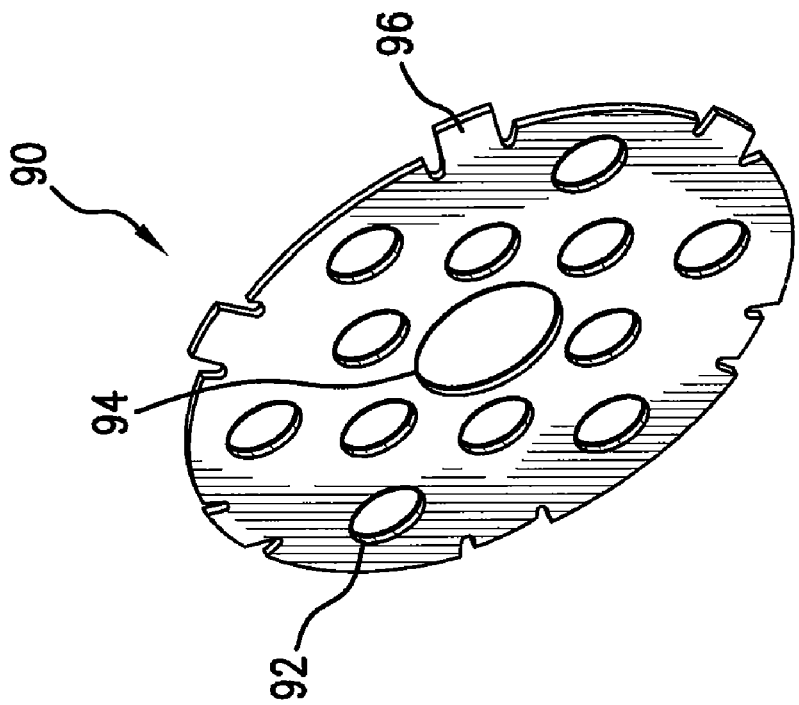
FIG. 5 is an enlarged perspective view of an output end retainer disk in isolation and in accordance with one embodiment.

FIG. 5 illustrates, in isolation, a diffuser end retainer disk 90 such as can desirably be disposed at the diffuser end of a gas generant container construction, in accordance with one aspect of the invention.

The diffuser end retainer disk 90 is generally similar to the initiator end retainer disk 82 described above. For example, the diffuser end retainer disk 90 is generally planar and is perforated, including perforations or holes generally designated by the reference numeral 92, so as to allow product gas communication therethrough and into the diffuser section. The retainer disk 90 includes a central opening 94 axially aligned with the central opening of the gas generant material wafers, thus facilitating the rapid communication of the combustion products from the combustion chamber to the diffuser section.

The diffuser end retainer disk 90 also similarly includes a plurality of deformable joinder tabs 96. The joinder tabs 96 upon deformation serve to secure the diffuser end retainer disk 90 to the container tube at or near the respective end thereof.

The diffuser end retainer disk 90, in addition to assisting in retaining gas generant wafers properly positioned, can additionally serve to prevent the bulk of the burnt gas generant material, oftentimes simply referred to as "slag," from exiting the combustion chamber and such as may otherwise act to plug or obstruct one or more of the exit openings from the gas generator device such as could result in erratic pressure variations in the gas generator output and such as could lead to unacceptable performance.

Those skilled in the art and guided by the teachings herein provided will appreciate that the inclusion and use of the deformable joinder tabs 88 and 96 provide or result in a simple design that helps ensure positive retention of the gas generant wafers with minimal parts and such as can desirably facilitate manufacture and production.

Figure 6:
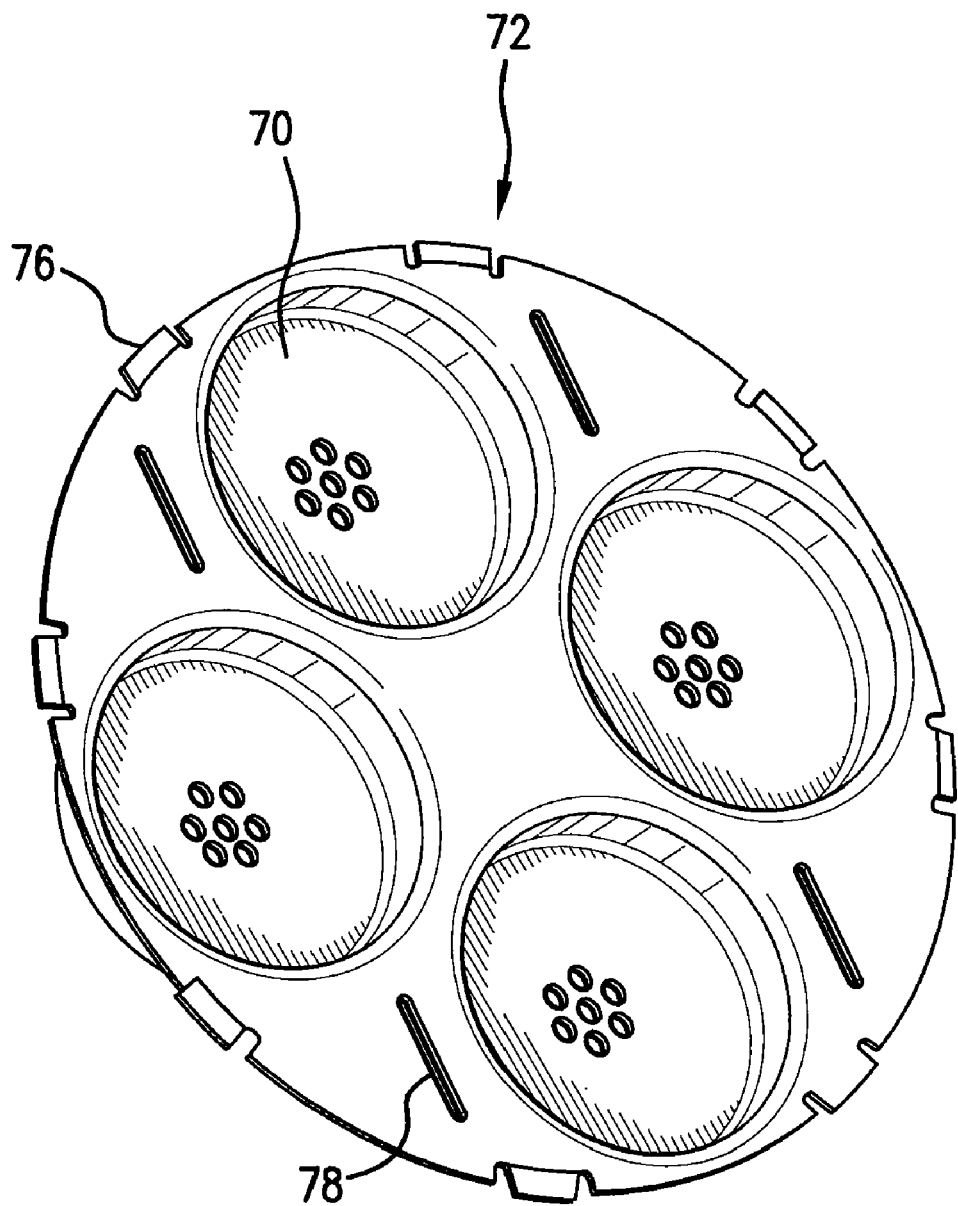
FIG. 6 is an enlarged perspective view of an igniter end retainer plate in isolation and in accordance with one embodiment.

FIG. 6 shows the igniter end retainer plate 72 in isolation. The igniter end retainer plate 72 is generally circular in cross section and includes four perforated cups 70. As described above, one or more of the perforated cups may hold, contain or otherwise have disposed therein a quantity of the ignition material such as can be reacted to form ignition products upon proper actuation of the gas generator.

The retainer plate 72 also includes a plurality of deformable joinder tabs 76. The joinder tabs 76 upon deformation serve to secure the retainer plate 72 to the respective end of the housing 12 until the plate 72 can be secured in place by the inertia weld 24, shown in FIG. 1.

The retainer plate 72 further may desirably include a plurality of slots 78 such as may serve to secure corresponding tabs (not shown) of the ignition material-retaining screen mesh 74.

As will be appreciated, relatively large gas generator devices such as may be desired for at least certain fire suppression applications may typically include a relatively large amount of free volume (e.g., volume not taken up by internal parts or gas generant). The presence of such free volume can cause significant operational and performance problems or difficulties in conventional gas generator devices particularly during the ignition phase of the functioning of the device. For example, conventional gas generator devices such as used for airbag vehicular safety restraint systems typically require the additional inclusion of a relatively large amount of a secondary ignition material (e.g., 2-4 grams) as compared to the amount of gas generant material (e.g., 120 grams) therein contained to overcome the effects of the inclusion of such a large free volume.

However, as shown in FIG. 2, with the gas generator 10, with the igniter end tube retainer plate 72 held firmly in place at the weld curl 24, a relative small ignition chamber 30 is formed between the igniter end tube retainer plate 72 and the base end wall 22. With such a relatively small ignition chamber, the ignition material burns in a small, confined area and need not heat all the free volume contained within the gas generator device in order to realize desired operation of the gas generator device. The ignition products (e.g., heated gases and burning ignition material) are then directed down the center of each of the gas generant containers 44, through perforations in the igniter tube retainer plate 72, such as to directly ignite the gas generant wafers 54. Thus, in accordance with one preferred embodiment, through the design herein described a relatively small amount of secondary ignition material (e.g., 40 grams) as compared to the amount of gas generant material (e.g., 4185 grams) therein contained for a fire suppression application. Thus, whereas a fire suppression-sized gas generator device as herein described may, in accordance with one embodiment, contain ignition material and gas generant material in a ratio (%) of 1% or less, gas generator devices such as used for passenger airbag vehicular safety restraint system may more typically contain ignition material and gas generant material in a ratio (%) of greater than 3%.

Figure 7:
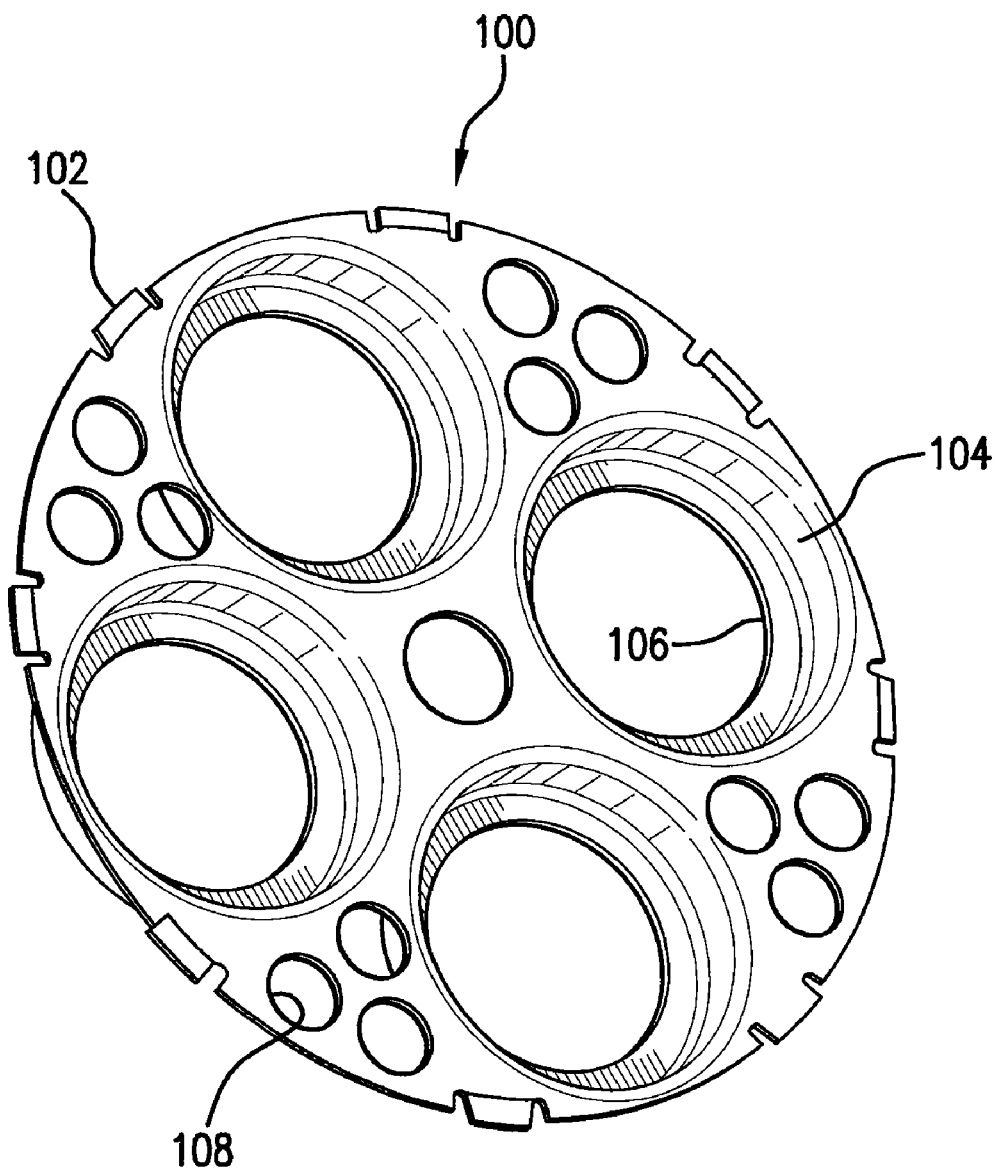
FIG. 7 is an enlarged perspective view of an output end retainer plate in isolation and in accordance with one embodiment.

FIG. 7 illustrates a diffuser end retainer plate 100 such as can desirably be disposed at the diffuser end of the gas generator, in accordance with one aspect of the invention. The diffuser end retainer plate 100 is generally similar to the initiator end retainer plate 72 described above. For example, the diffuser end retainer plate 100 is generally circular in cross section and includes a plurality of deformable joinder tabs 102. The joinder tabs 102 upon deformation serve to secure the retainer plate 100 to the respective end of the housing until the plate 100 can be secured in place by the inertia weld 36, such as shown in FIG. 2.

The diffuser end retainer plate 100 includes four cups 104. The cups 104 each include a central opening 106 such as to allow the product gas formed upon combustion of the gas generant material to exit from the combustion chamber and pass into the diffuser chamber for subsequent discharge from the gas generator device.

The diffuser end retainer plate 100 may, as shown, also include a plurality of openings 108 disposed between the cups 104 to facilitate passage of product gas therethrough.

Figure 8:
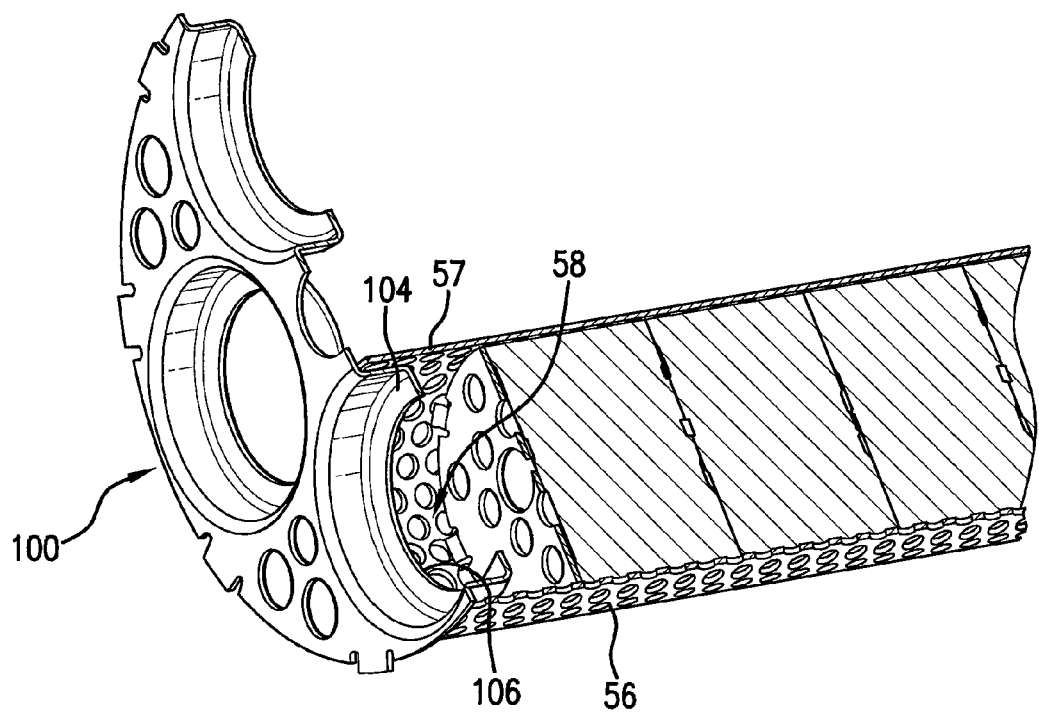
FIG. 8 is an enlarged fragmentary view highlighting the placement of a gas generant container with an output end retainer plate in accordance with one embodiment.

The perforated cups 70 of the igniter end retainer plate 72 and the perforated cups 104 of the diffuser end retainer plate 100 can desirably be sized and shaped for press fit placement at the respective ends of the gas generant containers. For example, FIG. 8 shows a cup 104 in the diffuser end retainer plate 100 placed in press fit engagement with the diffuser end of a gas generant container 56.

As will be appreciated, undesired shifting or movement of or by the gas generant container tubes during functioning of the device could compromise the performance and safety of the device and its operation. With the device of the invention, the gas generant containers are firmly held in position during the functioning of the gas generator. Thus, ignition product gas and combustion product gas can flow in and around the gas container tubes and those tubes remain stable with the occurrence of minimal or no localized high pressure zones.

It is to be understood that while the gas generator device 10 has been shown with retainer plates having four perforated cups and thus having the capability of including four gas generant containers, the broader practice of the invention is not necessarily so limited. For example, in particular applications, the invention can suitably be practiced with one, two, three, four, five, six, seven or other selected number of gas generant containers.

Moreover, while the gas generator device 10 has been shown as having the capability of including four gas generant containers, in particular applications it may be desired that one or more of the perforated cups not include a gas generant container. Thus, if desired, one or more retainer plate perforated cups may go unutilized in a particular application.

It is to be further understood that in general a symmetrical placement or positioning of gas generant-containing containers within the gas generant chamber of a gas generator device can be and typically is or will be an important factor in the performance of the gas generator.

Those skilled in the art and guided by the teachings herein provided will appreciate that either or both the size (including, for example, length and diameter) and the number of gas generant wafer stacks and gas generant containers included within a gas generator such as described above, can be specifically chosen or selected to provide appropriate gas production capabilities such as may be required for different applications. In particular, a gas generator such as herein described, such as including the above-described retainer disks, permits one to several gas generant wafers per gas generant container to be solidly retained thus allowing for adjustments in gas generator performance (e.g., gas output and rate of production) for various fire suppression scenarios for which such a gas generator might be applied.

As noted above, a subject gas generator device constructed for a fire suppression application is typically significantly larger than gas generators constructed for application in standard passenger vehicular supplemental restraint systems application. For such larger gas generator constructions, the forces associated and involved with operations such as the handling, manufacture, transportation and implementation are correspondingly also commonly significantly larger. Advantageously, the above-described gas generator includes various features including, for example, the gas generant container constructs and retainer end plates, such as can desirably serve to protect the gas generant material, such as in the form of pyrotechnic gas generant wafers, from the impact of forces such as may otherwise cause movement and deterioration of the wafers.

With a gas generator such as herein described, advances in gas generant formulations and processing as well as streamline gas generator packaging, such as developed in the context of airbag inflatable restraint systems such as developed for use in motor vehicles, can find suitable application and use in fire suppression applications. The subject gas generator device provides one of the smallest and lightest fire suppression systems available.

Moreover, a gas generator such as herein described desirably satisfies important gas generator design criteria such as including: gas generant loading density, fabrication feasibility such as relating to chamber fabrication and component manufacture, and high speed production capability such as desired and oftentimes required in modern commercial production.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A gas generator comprising:
 a housing having oppositely disposed first and second ends, adjacent the first end, the housing at least in part defining a first chamber containing a quantity of ignition material and, adjacent the second end, the housing at least in part defining a second chamber containing a quantity of gas generant material; and
 an initiator operatively associated with the first chamber and in reaction initiating communication with at least a portion of the quantity of ignition material, the initiator, upon actuation, to initiate reaction of at least a portion of the quantity of ignition material to form ignition products;
 wherein the second chamber includes at least one container wherein at least a portion of the quantity of gas generant material is contained, the container having a perforated side wall and oppositely disposed first and second end walls, with the first end wall perforated and disposed adjacent the first chamber to allow communication of at least a portion of the ignition products therethrough and into contact with gas generant material therein contained to ignite the gas generant material to produce a product gas and with the second end wall perforated to allow gas flow communication of the product gas therethrough for discharge from the gas generator.

2. The gas generator of claim 1 wherein the second chamber includes a plurality of said containers.

3. The gas generator of claim 1 wherein the at least one container comprises a cylindrical tube.

4. The gas generator of claim 1 wherein the ignition material within the first chamber is in tablet form.

5. The gas generator of claim 1 wherein the gas generant material within the at least one container is in wafer form.

6. The gas generator of claim 5 wherein the gas generant material within the at least one container comprises a plurality of wafers.

7. A gas generator comprising:
a housing having oppositely disposed first and second ends, adjacent the first end, the housing at least in part defining a first chamber containing a quantity of ignition material and, adjacent the second end, the housing at least in part defining a second chamber containing a quantity of gas generant material; and
an initiator operatively associated with the first chamber and in reaction initiating communication with at least a portion of the quantity of ignition material, the initiator, upon actuation, to initiate reaction of at least a portion of the quantity of ignition material to form ignition products;
wherein the second chamber includes at least one container wherein at least a portion of the quantity of gas generant material is contained, wherein the gas generant material within the at least one container is in wafer form, the container having a perforated side wall and oppositely disposed first and second end walls, with the first end wall perforated and disposed adjacent the first chamber to allow communication of at least a portion of the ignition products therethrough and into contact with gas generant material therein contained to ignite the gas generant material to produce a product gas and with the second end wall perforated to allow gas flow communication of the product gas therethrough for discharge from the gas generator,
wherein the at least one container is a cylindrical tube and at least one of the first and second end walls comprises a perforated retainer disk secured to a respective end of the cylindrical tube.

8. The gas generator of claim 7 wherein the perforated retainer disk comprises a plurality of deformable joinder tabs, the joinder tabs upon deformation to secure the retainer disk to the respective end of the cylindrical tube.

9. A gas generator comprising:
a housing having oppositely disposed first and second ends, adjacent the first end, the housing at least in part defining a first chamber containing a quantity of ignition material and, adjacent the second end, the housing at least in part defining a second chamber containing a quantity of gas generant material; and
an initiator operatively associated with the first chamber and in reaction initiating communication with at least a portion of the quantity of ignition material, the initiator, upon actuation, to initiate reaction of at least a portion of the quantity of ignition material to form ignition products;
wherein the second chamber includes at least one container wherein at least a portion of the quantity of gas generant material is contained, the container having a perforated side wall and oppositely disposed first and second end walls, with the first end wall perforated and disposed adjacent the first chamber to allow communication of at least a portion of the ignition products therethrough and into contact with gas generant material therein contained to ignite the gas generant material to produce a product gas and with the second end wall perforated to allow gas flow communication of the product gas therethrough for discharge from the gas generator,
wherein the first end wall at least in part comprises an igniter end retainer plate and the second end wall at least in part comprises an output end retainer plate.

10. The gas generator of claim 9 wherein the igniter end retainer plate and the output end retainer plate each comprises a plurality of deformable joinder tabs, the igniter end retainer plate joinder tabs upon deformation to secure the igniter end retainer plate to the first end of the housing and the output end retainer plate joinder tabs upon deformation to secure the output end retainer plate to the second end of the housing.

11. The gas generator of claim 9 wherein the igniter end retainer plate and the output end retainer plate each comprise a perforated cup to be disposed at an opposite end of the at least one container.

12. The gas generator of claim 1 sized for fire suppression application and containing ignition material and gas generant material in a ratio (%) of 1% or less.

13. A gas generator assembly comprising:
an enclosed housing having an elongated length and oppositely disposed first and second ends, adjacent the first end the housing at least in part defining a first chamber containing a quantity of ignition material tablets and, adjacent the second end the housing at least in part defining an elongated second chamber containing a quantity of gas generant material;
an initiator operatively associated with the first chamber and in reaction initiating communication with at least a portion of the quantity of ignition material tablets, the initiator, upon actuation, to initiate reaction of at least a portion of the quantity of ignition material tablets to form ignition products;
wherein the second chamber at least in part contains at least first and second gas generant containers, the first and the second gas generant containers each comprising:
a perforated cylindrical tube having oppositely disposed first and second end walls with a plurality of gas generant material wafers disposed therebetween;
the first end walls each comprising a first perforated retainer disk secured to the first end of the respective perforated cylindrical tube and disposed adjacent the first chamber to allow communication of at least a portion of the ignition products therethrough and into contact with gas generant material therein contained to ignite the gas generant material to produce a product gas and
the second end walls each comprising a second perforated retainer disk secured to the second end of the respective perforated cylindrical tube perforated to allow gas flow communication of the product gas therethrough for discharge from the gas generator; and
wherein the gas generator assembly additionally comprises;

a tube first end retainer plate disposed between the first chamber and the first end walls of the first and second gas generant containers and a tube second end retainer plate disposed adjacent the second end walls of the first and second gas generant containers opposite the plurality of gas generant material wafers.

14. The gas generator assembly of claim 13 wherein:
the tube first end retainer plate and the tube second end retainer plate each comprise first and second perforated cups to be disposed at opposite ends of the first and the second gas generant containers, respectively.

15. The gas generator assembly of claim 13 sized for fire suppression application and containing ignition material and gas generant material in a ratio (%) of 1% or less.

16. The gas generator of claim 7 wherein the second chamber includes a plurality of said containers.

17. The gas generator of claim 7 wherein the ignition material within the first chamber is in tablet form.

18. The gas generator of claim 7 wherein the gas generant material within the at least one container comprises a plurality of wafers.

19. The gas generator of claim 9 wherein the second chamber includes a plurality of said containers.

20. The gas generator of claim 9 wherein the at least one container comprises a cylindrical tube.

* * * * *